INVENTOR.
William Kober,

INVENTOR.
William Kober,
BY
Bean, Brooks, Buckley & Bean
ATTORNEYS.

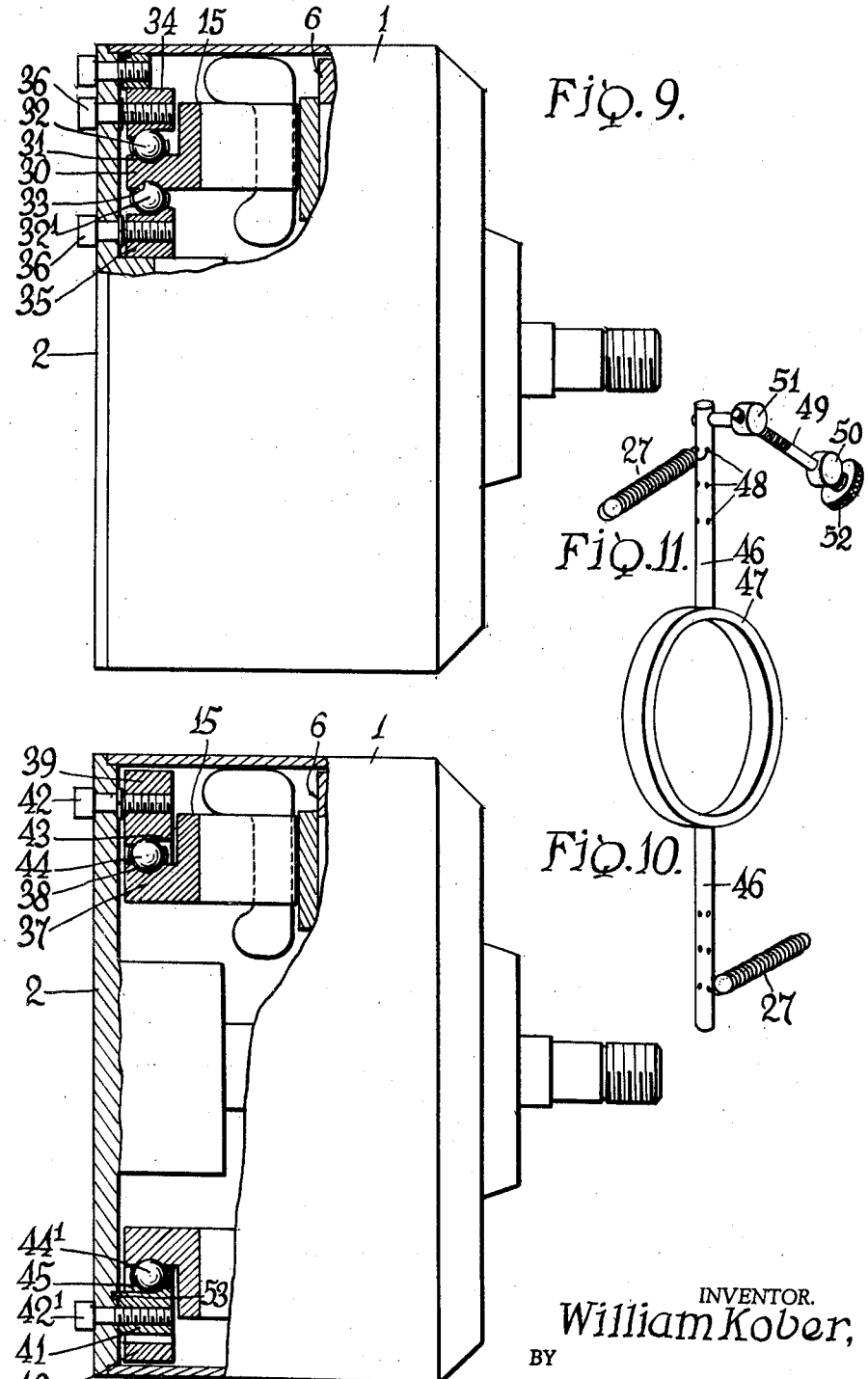

United States Patent Office 3,192,422
Patented June 29, 1965

3,192,422
SPIRAL BEARING SUPPORT
William Kober, Fairport, N.Y., assignor, by mesne assignments, to The Garrett Corporation, Los Angeles, Calif., a corporation of California
Filed Mar. 30, 1960, Ser. No. 18,706
20 Claims. (Cl. 310—191)

This invention is directed generally to a new and useful spiral bearing support for a member, such as a generator armature, intended to move about and along an axis.

In my Patent 2,824,275, granted February 18, 1958, I disclose axial air gap generator constructions incorporating structures supporting either the armature, or the field producing member for movement relative to the other to change the length of the air gap. In such arrangements, the supported member must not wobble as it moves, and the working faces must be maintained in parallelism, at least at their closest approach.

One way of accomplishing this is to support the movable member on a spiral ball bearing, whereby rotation of the member about the axis is translated into movement of the member along the axis. However, conventional bearings are not sufficiently tight and wobble free, because of manufacturing tolerances.

Accordingly, the primary object of my invention is to provide a spiral bearing, for mounting an armature, field producing structure or the like, which bearing is adjustable to take up any looseness resulting from manufacturing tolerances.

In one aspect thereof, a spiral bearing support constructed in accordance with my invention is characterized by the provision of races providing paired grooves of spiral form, multiple balls in the grooves in angular rolling contact with the races, the races including groove defining portions having angular contact with the balls in one of the grooves in opposition to the angular contact thereof with the balls in the other of the grooves, and the groove defining portions being relatively movable in the direction of the axis to adjust the extent of opposed angular contact thereof with the balls.

The foregoing and other objects, advantages and characterizing features of the support of my invention will become clearly apparent from the ensuing detailed description of certain presently contemplated embodiments thereof, taken in conjunction with the accompanying drawing wherein like reference numerals denote like parts throughout the various views and wherein:

FIG. 9 is a side elevational view, partly in longitudinal section, of a generator having an armature supported by a modification of my invention;

FIG. 10 is a similar view, but illustrating still another modification; and

FIG. 11 is a diagrammatic, perspective view of a construction for adjusting the spring rate and zero point of the return springs.

Figure 1:
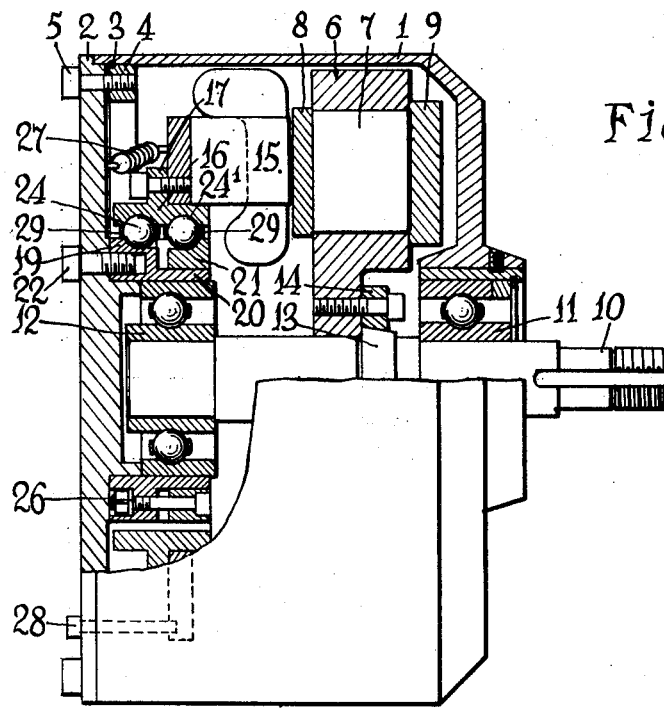
FIG. 1 is a longitudinal sectional view, partly in elevation, of a generator having its armature supported by a presently preferred form of spiral bearing of my invention.

Referring now in detail to the accompanying drawings, and in particular to the embodiment illustrated in FIGS. 1–8, there is shown a generator of the axial air gap type contained within a casing 1 having a normally open end closed by a removable end bell 2. End bell 2 is secured to casing 1 by an O-ring 3 secured in an internal circumferential groove in casing 1 by a shouldered locking ring 4 which engages behind ring 3 and which is secured to the end bell by fastening members 5.

The generator includes a rotor, generally designated 6 and comprising a permanent magnet field producing structure such as disclosed in my earlier Patent 2,719,931, granted October 4, 1955. Rotor 6 carries permanent magnets 7, with pole shoes 8 at the air gap end faces thereof and a return plate 9 at the opposite end faces thereof, and is carried by a drive shaft 10 journaled in a bearing 11 carried by the normally closed end wall of casing 1, and in a bearing structure 12 adjacent end bell 2.

Rotor 6 is secured in proper position on shaft 10 by an arrangement including a tapered shoulder 13 on the shaft and against which the rotor is held by a locking ring 14 wedged on the tapered shoulder 13.

The generator armature is generally designated 15, and is mounted for movement along the axis of rotor rotation toward and away from the rotor 6, to change the length of the air gap between the working faces thereof in the manner contemplated in my earlier Patent 2,824,275. However, in this instance the stator 15 is supported for such movement by the spiral bearing of the instant invention.

The spiral bearing of this invention comprises an outer spiral race 16 having a flange 17 which mounts against stator 15. Accordingly, the mounting face of flange 17 is perpendicular to the bore of the running bearing 12. The outer race 16 is formed with three sets of paired spiral grooves 18, 18', which sets are spaced apart around the inner periphery of the outer race 16 as clearly illustrated in FIG. 4.

Figure 5:
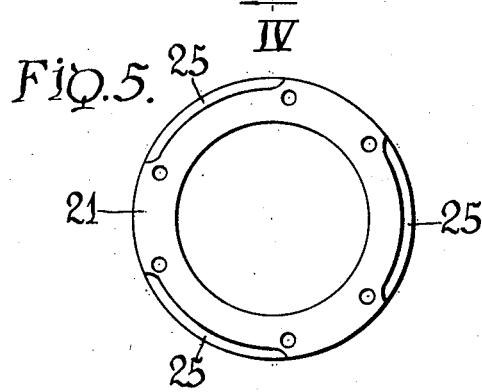
FIG. 5 is a front elevational view of the movable inner race.
Figure 6:
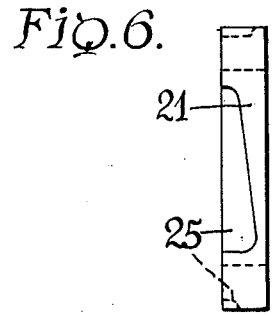
FIG. 6 is a side elevational view thereof.
Figure 7:
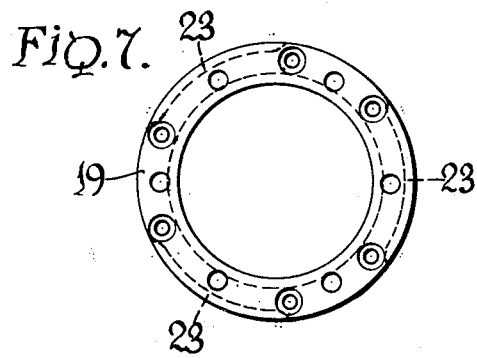
FIG. 7 is a front elevational view of the main inner race.
Figure 8:
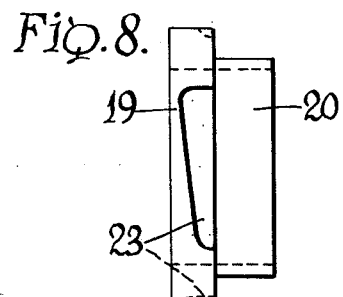
FIG. 8 is a side elevational view thereof.

The bearing is completed by a main inner spiral race 19 having a cylindrical sleeve extension 20 (FIGS. 7 and 8), and a movable inner spiral race 21 (FIGS. 5 and 6). The main inner spiral race 19 is mounted on the end bell 2 by adjustable fastening devices 22, and the running bearing 12 for rotor shaft 10 is carried by the main inner bearing race 19, as clearly illustrated in FIG. 1, for convenience and compactness. The main inner race 19 is formed with three spiral grooves 23 open at the inner side thereof and having angular contact with the balls 24 which are confined in the corresponding grooves 18, 23. The movable inner race 21 is provided with three grooves 25 open at the outer side thereof and having angular contact with the balls 24' confined in the corresponding grooves 18', 25.

Figure 2:
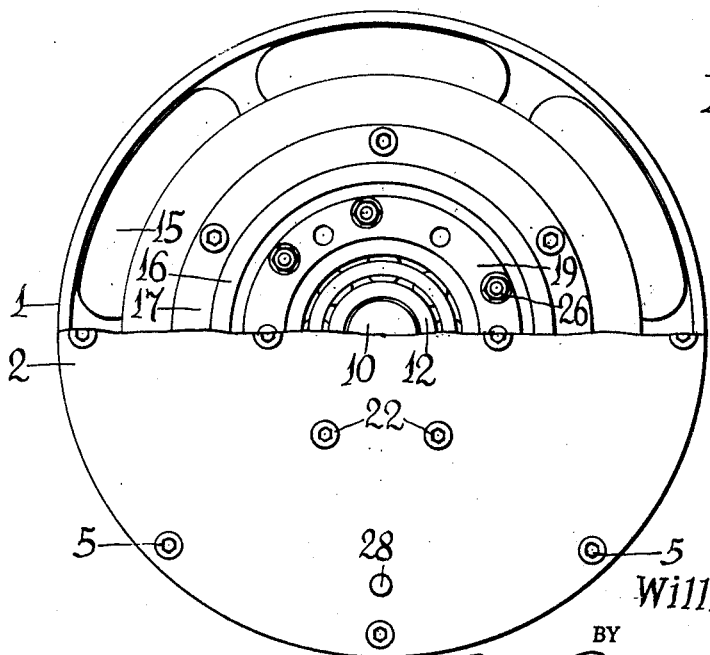
FIG. 2 is a rear elevational view thereof, with the rear end bell cut away.
Figure 3:
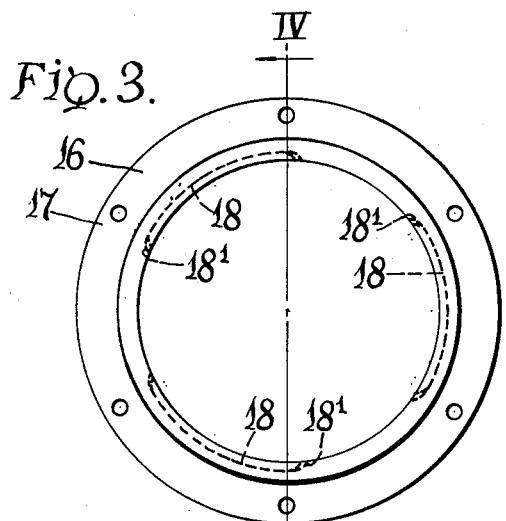
FIG. 3 is a front elevational view of the outer bearing race.
Figure 4:
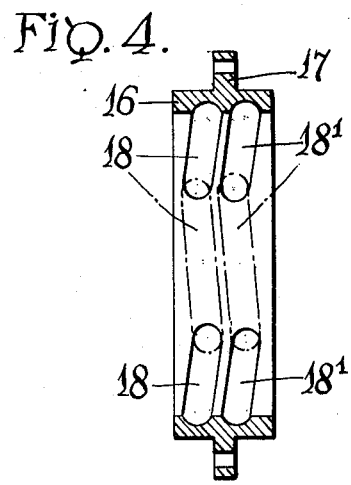
FIG. 4 is a longitudinal sectional view thereof, taken about on line IV—IV of FIG. 3.

It will be observed from FIG. 1 that the inner race sections 19, 21 are in opposed angular contact with the balls 24, 24' in the respective grooves, and it is a particular feature of my invention that the inner race section 21 is movable toward and away from the inner race section 19, in the direction of the axis of rotor rotation, thereby to adjust the contact pressure and compensate for any looseness which otherwise might occur because of manufacturing tolerances. To this end, the inner race section 21 is guidingly supported in the sleeve 20 of the inner race section 19 for movement therealong, and is secured to section 19 by adjustable fastenings 26 extending therebetween (FIGS. 1 and 2). With this arrangement, the axial position of the inner race section 21 relative to the inner race section 19 can be adjusted as required, and at least three fastenings 26 are provided, at spaced points around the bearing, to define the plane of the inner race section 21. In the illustrated embodiment, six fastenings are provided, for greater rigidity and strength.

The inner race section 19 is secured to end bell 2 by three or more adjustable fastenings 22, whereby the working surface of armature 15 can be brought into parallelism with the working surface of rotor 6, and will move toward and away from the rotor substantially without wobble or looseness. Even if the bearings themselves are not in parallelism, the angular rotation is so limited that it will not matter, so long as the stator is arranged to have its working surface parallel to that of the rotor at the closest approach thereto.

Return springs 27 (FIG. 1) secured at one end to a fixed portion, such as the end bell 2, and at their other ends to the stator 15, are provided to elastically restrain movement of the stator toward the rotor, in the manner disclosed in my earlier patent. Also, stops can be provided to limit the movement of the stator, which stop can comprise a pin 28 carried by the end bell 2 and engaging a slot in the stator or in the main race 16.

The bearings are confined in cages 29, there being two such cages in the embodiment of FIG. 1, with each cage having three angular slots corresponding to the spiral grooves in the races. The purpose of such slots is to keep the three sets of balls 24, 24' in phase, and in the same relation to the ends of the grooves, for proper operation.

In some instances, circumstances might dictate that the paired grooves lie substantially in a common plane, and not be spaced apart lengthwise of the axis of rotor rotation as in FIG. 1. In such case, the embodiment of FIG. 9 can be used, wherein there is provided a center race 30 connected to stator 15 and having three, or more grooves 31 in the outer periphery thereof, for receiving balls 32, and having three, or more spiral grooves 33 in the inner periphery thereof for receiving balls 32'. An outer race 34 is provided with three, or more grooves, open at one side and corresponding to the outer grooves 31 of the center race 30, and an inner race 35 is provided with three, or more grooves, open at the other side and corresponding to the inner grooves 33 of the center race 30. The outer and inner races 34, 35 are secured to end bell 2 by fastenings 36 of a type causing the races 34, 35 to move lengthwise of the axis of rotor rotation upon rotating the fastenings 36. It will be observed that the inner and outer races 34, 35 have opposed angular contact with the balls 32, 32', respectively, and by manipulating the fastenings 36 the relative position of the races 34, 35 lengthwise of the axis can be adjusted to provide the desired angular contact pressure, and thereby take up any looseness which otherwise might occur, in much the same manner as previously described with reference to FIG. 1. However, here the paired bearing grooves are spaced apart radially of the axis of rotor rotation.

Another way of achieving this is illustrated in FIG. 10, wherein there is provided an inner race 37 secured to the stator 15 and having six, or more spiral grooves 38 circumferentially arranged thereon at the same radius from the axis of rotor rotation. A first outer race is provided, in the form of three sectors 39 spaced apart around the bearing and connected by relatively thin bridging portions 40. A second outer race is provided in the form of three sectors 41 which can be joined by bridging portions to comprise a ring, or which can be completely independent of one another and each mounted against the end bell 2 by fastenings 42, with tongues 53 holding the sectors against movement. The connected sectors 39 of the first outer race are mounted on end bell 2 by three or more adjustable fastenings 42 of the type whereby rotation of the fastenings will advance or retract the sectors 39 in the direction of the axis of rotor rotation. The bridging portions 40 of the first outer race extend across the sectors 41 of the second outer race. The race sectors 39 are provided with grooves 43 open at the inner side thereof and having angular contact with the balls 44 in alternating grooves 38 on the inner race 37. The race sectors 41 have grooves 45 open at the outer side thereof and having angular contact, in the opposite direction, with balls 44' in the other grooves 38 of the inner race 37. Here again, the paired grooves lie substantially in a common plane, but they are spaced apart peripherally or circumferentially, and not radially as in FIG. 9.

Where extreme rigidity is not required, four grooves, comprising two sets of paired grooves spaced apart circumferentially, could be used.

Where it is desired to adjust the tension on the springs 27, that can be accomplished by the arrangement illustrated in FIG. 11. Here, the springs are secured to arms 46 of a member having a sleeve 47 for mounting on the end bell, whereby the member 46, 47 can be rotated about the axis of rotor rotation. A number of openings 48 are provided, with the springs being hooked into any one of them, the other ends of the springs being connected to the stator. Means are provided for adjusting the angular position of the arms 46 about the axis of rotor rotation, which means can comprise a screw 49 journaled in a boss 50 mounted on end bell 2, the screw threadedly engaging a member 51 extending through end bell 2 and pivotally secured to one of the arms 46. Merely turning the screw 49, by the thumb grip 52, will cause the desired change in the angular position of the arms 46 relative to the axis of rotation. This, plus the numerous openings 48 provides means for adjusting both the spring rate and the zero point of the return springs 27.

Obviously, cages containing angular slots, similar to the cages 29, will be provided in the embodiments of FIGS. 9 and 10, to keep the sets of balls in proper phase relation.

Accordingly, it is seen that my invention fully accomplishes its intended objects, and it will be appreciated that while I have disclosed only certain forms of my invention, with particular reference to a dynamoelectric machine, I do not thereby intend that my invention be limited to the details of such embodiments, or to use in such machines.

Having fully disclosed and completely described my invention, together with its mode of operation, what I claim as new is:

1. Means supporting a member for rotation about an axis and for translating such rotation into movement of said member along said axis comprising, spiral bearing means having races providing paired grooves of spiral form relative to said axis, multiple balls in said grooves in angular rolling contact with said races, said races including groove defining portions having angular contact with the balls in one of said paired grooves in opposition to the angular contact thereof with the balls in the other of said paired grooves, said groove defining race portions being relatively movable in the direction of said axis to adjust the contact pressure against said balls.

2. The combination set forth in claim 1, wherein said paired grooves are spaced apart in the direction of said axis.

3. The combination set forth in claim 1, wherein said paired grooves are spaced apart generally radially of said axis.

4. The combination set forth in claim 1, wherein said paired grooves are defined in part by a race member common thereto, and are spaced apart circumferentially of said race member.

5. The combination set forth in claim 1, wherein said paired grooves are defined in part by a race member common thereto, and are positioned on opposite sides of said race member.

6. In a dynamoelectric machine, a stator, a rotor mounted for rotation about an axis, and means supporting one of said stator and said rotor for movement along said axis, said last-named means comprising bearing means having inner and outer races providing paired spiral grooves, and multiple balls in said paired grooves in rolling contact with said races, said races including relatively movable groove defining portions in opposed angular contact with the balls in one of said paired grooves as compared with the balls in the other of said paired grooves.

7. In a dynamoelectric machine, a rotor, mounting means supporting said rotor for rotation about an axis, a stator, said rotor and said stator having working surfaces spaced apart along said axis to provide an axial air gap therebetween, and means supporting said stator for movement along said axis toward and away from said rotor, said last-named means comprising ball bearing means having races providing paired spiral grooves, and multiple balls confined in said grooves in rolling contact with said races, said races including groove defining portions relatively movable in the direction of said axis and contacting the balls in one of said paired grooves in opposed angular relation to the balls in the other of said paired grooves.

8. A dynamoelectric machine as set forth in claim 7, wherein said mounting means supporting said rotor comprises a shaft journaled in a bearing, said shaft bearing being carried by said stator supporting bearing means.

9. In a dynamoelectric machine, a rotor supported for rotation about an axis, a stator, and means supporting said stator for movement about and along said axis, said last-named means comprising spiral bearing means having races providing three sets of paired spiral grooves arranged about said axis, and multiple balls in said grooves in angular rolling contact with said races, said races including groove defining portions relatively movable in the direction of said axis and contacting the balls in one groove of each set thereof in opposed angular relation to the balls in the other groove of each set thereof.

10. A dynamoelectric machine as set forth in claim 9, together with yieldable means urging said stator into a predetermined position about said axis.

11. A dynamoelectric machine as set forth in claim 10, wherein said yieldable means comprise spring means, together with means for adjusting the tension on said spring means when said stator is in said predetermined position.

12. An electric generator of the axial air gap type having an armature, a field producing structure, said armature, and said field producing structure having working surfaces spaced apart to provide an axial air gap therebetween, means mounting at least one of said armature and said field producing structure for movement relative to the other thereof in response to torque changes therebetween produced by variations in the electrical load on said generator in a manner to vary the length of said air gap, wherein said means comprises spiral bearing means having races providing three sets of paired spiral grooves, and multiple balls in said grooves in angular rolling contact with said races, said races including first groove defining portions having angular rolling contact with the balls in one groove of each of said sets of grooves and second groove defining portions having angular rolling contact with the balls in the other groove of each of said sets of grooves in opposition to said first groove defining portions, said first and second groove defining portions being adjustable one relative to the other laterally of said grooves, and means yieldably resisting such relative movement in a direction to shorten the length of said air gap.

13. In a dynamoelectric machine, a rotor, means supporting said rotor for rotation about an axis, a stator, and means supporting said stator for movement about and along said axis comprising spiral bearing means having an outer race connected to said stator and formed with three sets of paired spiral grooves, a first inner race section formed with three grooves corresponding to one groove of each set thereof in said outer race, a second inner race section formed with three grooves corresponding to the other grooves in said outer race member, multiple balls in said grooves, said first and second inner race sections being in opposed angular contact with the balls in said grooves, mounting means for said first inner race section, said second inner race section being mounted on said first inner race section for movement relative thereto in the direction of said axis, and means for holding said second inner race section in adjusted position relative to said first inner race section.

14. A dynamoelectric machine as set forth in claim 13, wherein said first inner race section has a sleeve portion upon which said second inner race section is mounted, and wherein said rotor supporting means comprise a bearing carried by said first inner race section.

15. A dynamoelectric machine as set forth in claim 13, wherein said holding means comprise three separate fastenings extending between said inner race sections in spaced apart relation therearound.

16. In a dynamoelectric machine, a rotor mounted for rotation about an axis, a stator, and means supporting said stator for movement about and along said axis comprising a spiral bearing having a center race connected to said stator and formed with three spiral grooves on its outer periphery and three spiral grooves on its inner periphery, an outer race having three spiral grooves corresponding to the three outer grooves of said center race, an inner race having three spiral grooves corresponding to the three inner grooves of said center race, multiple balls in said grooves in rolling contact with said races, said inner and outer races having opposed angular contact with said balls, and means mounting at least one of said inner and outer races for movement relative to the other thereof in the direction of said axis.

17. In a dynamoelectric machine, a rotor mounted for rotation about an axis, a stator, and means supporting said stator for movement about an along said axis comprising, a spiral bearing having a first race connected to said stator and formed with six spiral grooves arranged around said axis, a second race having three spiral grooves corresponding to three alternating grooves of said first race, a third race having three spiral grooves corresponding to another three alternating grooves of said first race, multiple balls in said grooves in rolling contact with said races, said second and third races having opposed angular contact with said balls, and means mounting at least one of said second and third races for movement relative to the other thereof in the direction of said axis.

18. A dynamoelectric machine as set forth in claim 17, wherein one of said second and third races comprises three individual race sections.

19. A dynamoelectric machine as set forth in claim 16, wherein both said inner and said outer races are mounted for movement relative to the other thereof in the direction of said axis.

20. A dynamoelectric machine as set forth in claim 17, wherein both said second and said thrid races are mounted for movement relative to the other thereof in the direction of said axis.

References Cited by the Examiner
UNITED STATES PATENTS

| | | | |
|---|---|---|---|
| 556,450 | 3/96 | Wellman | 308—185 |
| 592,595 | 10/97 | Phelps | 308—185 |
| 1,131,551 | 3/15 | Price | 310—209 |
| 2,824,275 | 2/58 | Kober | 310—191 X |
| 2,978,915 | 4/61 | Metcalf | 74—99 |

ORIS L. RADER, *Primary Examiner*.

MILTON O. HIRSHFIELD, *Examiner*.